US006701437B1

(12) United States Patent
Hoke et al.

(10) Patent No.: US 6,701,437 B1
(45) Date of Patent: Mar. 2, 2004

(54) METHOD AND APPARATUS FOR PROCESSING COMMUNICATIONS IN A VIRTUAL PRIVATE NETWORK

(75) Inventors: Mark R. Hoke, San Jose, CA (US); Leslie J. Arrow, Mountain View, CA (US)

(73) Assignee: VPNet Technologies, Inc., San Jose, CA (US)

( * ) Notice: Subject to any disclaimer, the term of this patent is extended or adjusted under 35 U.S.C. 154(b) by 0 days.

(21) Appl. No.: 09/188,867

(22) Filed: Nov. 9, 1998

Related U.S. Application Data

(63) Continuation-in-part of application No. 09/062,507, filed on Apr. 17, 1998, now Pat. No. 6,226,751.

(51) Int. Cl.[7] .................................. H04L 9/00
(52) U.S. Cl. .................. 713/201; 709/245; 709/249
(58) Field of Search ........................ 713/201, 200, 713/162, 153, 154; 370/351; 709/220, 227, 228, 230, 232, 238, 245, 249

(56) References Cited

U.S. PATENT DOCUMENTS

| | | | | |
|---|---|---|---|---|
| 5,835,726 A | * | 11/1998 | Shwed et al. | 709/229 |
| 5,950,195 A | * | 9/1999 | Stockwell et al. | 707/4 |
| 6,079,020 A | * | 6/2000 | Liu | 713/201 |
| 6,154,839 A | * | 11/2000 | Arrow et al. | 713/154 |
| 6,173,399 B1 | * | 1/2001 | Gilbrech | 713/153 |
| 6,175,917 B1 | * | 1/2001 | Arrow et al. | 713/1 |
| 6,182,226 B1 | * | 1/2001 | Reid et al. | 713/201 |
| 6,226,751 B1 | * | 5/2001 | Arrow et al. | 713/201 |
| 6,353,614 B1 | * | 3/2002 | Borella et al. | 370/389 |

OTHER PUBLICATIONS

Ferguson et al, "What is a VPN?", Apr. 1998, Revision 1, p. 1–22.*
Microsoft Press Computer Dictionary, 1997, Third Edition, p. 86, 498.*
"Ravlin 4, Wireline Performance Encryption Speeds of 4 MBPS" 1997, RedCreek Communications, Inc., p. 1–2.*
"Microsoft Press Computer Dictionary" Microsoft Press, 3rd Edition, p. 348.*
"Virtual Private Networks Resource Guide" 1997, Ascend Communications, Inc., p. 1–60.*
Airamo, "Virtual Private Networks" Nov. 28, 1997, Department of Computer Science Helsinki University of Technology, p. 1–9.*

* cited by examiner

*Primary Examiner*—Ayaz Sheikh
*Assistant Examiner*—Christopher Revak
(74) *Attorney, Agent, or Firm*—Park, Vaughan & Fleming LLP

(57) ABSTRACT

One embodiment of the present invention provides a computer system for processing communications in a virtual private network. The computer system operates in a selective mode, in which only communications transiting the virtual private network are processed according to specified virtual private network parameters, such as encryption, compression and authentication algorithms. Virtual private network communications passing between a public network and a private network are thus received and processed according to the algorithms, while other communications bypass the computer system. Multiple private networks may be served by a single computer system.

33 Claims, 8 Drawing Sheets

METHOD AND APPARATUS FOR PROCESSING COMMUNICATIONS IN A VIRTUAL PRIVATE NETWORK

RELATED APPLICATIONS

This application is a continuation-in-part of U.S. Pat. No. 6,226,751 (Ser. No. 09/062,507, filed Apr. 17, 1998) and is related to U.S. Pat. No. 6,079,020 (Ser. No. 09/013,743, filed Jan. 27, 1998).

FIELD OF THE INVENTION

The present invention relates to the field of data communications. More specifically, the present invention relates to a device for processing communications and a method of configuring such a device to selectively encrypt communications depending upon whether they are being passed between members of a virtual private network.

BACKGROUND

Organizations rely heavily upon their ability to communicate data electronically between their members, representatives, employees, etc. Such communications typically include electronic mail and some form of file sharing or file transfer. In a centralized, single site organization, these communications are most commonly facilitated by a local area network (LAN) installed and/or operated by the organization.

Preventing unauthorized access to data traversing an enterprise's single site LAN is relatively straightforward. As long as intelligent network management and adequate physical security are maintained, unauthorized access to the data passing across the LAN can be prevented. It is when the enterprise spans multiple sites that external security threats become a considerable problem.

For distributed enterprises wishing to communicate data electronically, several options exist but each has associated disadvantages. One option is to interconnect the various offices or sites with dedicated, or private, communication connections, often referred to as leased lines. This is a traditional method used by organizations to implement a wide area network (WAN). The disadvantages of implementing an enterprise-owned and controlled WAN are obvious: they are expensive, cumbersome and frequently underutilized if configured to handle the peak capacity requirements of the enterprise. The obvious advantage is that the lines are dedicated for use by the enterprise and are therefore reasonably secure from eavesdropping or tampering by other parties.

One alternative to using dedicated communication lines is to exchange data communications over the emerging public network space. For example, in recent years the Internet has evolved from a tool primarily used by scientists and academics into an efficient mechanism for global communications. The Internet provides electronic communication paths between millions of computers by interconnecting the various networks upon which those computers reside. It has become commonplace, even routine, for enterprises (including those in non-technical fields) to provide Internet access to at least some portion of the computers within the enterprises. For many organizations, Internet access facilitates communications with customers and potential business partners and promotes communications between geographically distributed members of the organization as well.

Distributed enterprises have discovered that the Internet is a convenient mechanism for enabling electronic communications between their geographically-separated members. For example, even remote sites within an enterprise can connect to the Internet through Internet Service Providers (ISP). Once they have access to the Internet, the various members of the enterprise can communicate among the enterprise's distributed sites and with other Internet sites as well. A significant disadvantage of using this form of intra-enterprise communications is the general lack of security afforded communications traversing public networks such as the Internet. The route by which a data communication travels from one point on the Internet to another point can vary on a per packet basis, and is therefore essentially indeterminate. Furthermore, the data protocols for transmitting information over the constituent networks of the Internet are widely known, thus leaving electronic communications susceptible to interception and eavesdropping, the danger of which increases as packets are replicated at most intermediate hops. Of potentially greater concern is the fact that communications can be modified in transit or even initiated by or routed to an impostor. With these disconcerting risks, most enterprises are unwilling to subject their proprietary and confidential communications to the exposure of the public network space. For many organizations, therefore, it is common to not only have Internet access available at each site, but also to maintain existing dedicated communications paths for internal enterprise communications, with all of the attendant disadvantages described above.

To address the need for means of passing secure communications, "virtual private networks" (VPNs) have been developed. A VPN allows an organization to communicate securely across an underlying public network, such as the Internet, even with remote sites. Virtual private networks typically include one or more virtual private network units, sometimes known as VPN service units or VSUs. VPN service units translate or exchange data packets between the public network and the organization's private WAN or LAN. Virtual private network units may reside in a number of locations, such as within an ISP or telephone company network or on the WAN or LAN side of a routing apparatus that connects the enterprise's network to the Internet. Thus, VPN units in known forms of virtual private networks generally receive and process all data traffic passed between an enterprise site (whether local or remote) and the public network. Within one enterprise network, a VSU may serve multiple network segments.

To ensure secure data communications between members of a single VPN, which may comprise one or more VPN groups, a VPN unit operates according to a number of parameters. The parameters include various compression, encryption, decryption and authentication algorithms, as well as parameters concerning security associations and access control. Parameters in effect for one VPN may differ from those used in another VPN, and may also vary between different groups within each VPN.

As described above, known VPN units typically form part of the data path connecting an enterprise's private LAN to the public network over which secure data communications are to be passed. This mode of operation presents at least two problems, however. First, because it forms part of the path along which all inter-network traffic travels, such a VPN unit constitutes a single point of failure. In other words, if a VPN unit fails all communications between the private and public networks connected to the unit are disrupted, not just the VPN traffic. As a second consequence of being part of the path for all data communications, those communications that need not be secured are still received and processed by the VPN unit, even though they are not VPN traffic. Therefore, current VPN unit configurations cannot help delaying all data communications, including those that are not being passed between members of a VPN.

An additional disadvantage to the current method of configuring VPNs and VPN units is that a VPN unit cannot be "hot-swapped." In other words, an installed VPN unit cannot be replaced without disrupting all data communications between the private and public networks. Further, each individual VPN unit is presently capable of processing communications for only a single private network that is connected to a public network through the VPN unit. A separate VPN unit is thus generally required for each private network.

There is, therefore, a need in the art for a VPN unit that can be configured to operate as part of a virtual private network without receiving and processing all data communications passing between the interconnected public and private networks. There also exist requirements for a VPN unit that can be replaced without disrupting all data communications and a VPN unit capable of serving multiple private networks. Methods of operating VPN units such as these, and methods of operating a VPN comprising such VPN units are also needed.

SUMMARY

The present invention provides a virtual private network (VPN) unit for selectively processing secure communications for members of a virtual private network. One embodiment of the present invention is used in a VPN operating over a public data network connected to an organization's private network (e.g., a LAN or WAN). The organization's private network includes one or more endstations that are members of the VPN. In this first embodiment, a VPN unit serving the VPN member endstations contains a processor, storage memories, and a communication port. A method of configuring the VPN unit is also provided, whereby VPN communications (e.g., communications requiring secure transmission between members of a VPN) are processed by the VPN unit but other communications bypass it.

The VPN unit is linked by a communication port to an interconnection between the public network and the private network. Data communications sent from the private network are received and processed by the VPN unit if they are to be secured for transmission across the VPN (i.e., they constitute VPN traffic). Data communications sent from the private network bypass the VPN unit, however, and pass directly to the public network if they are not VPN traffic. Conversely, communications directed to the private network from the public network are delivered to the VPN unit if they constitute VPN traffic but otherwise pass directly to the private network.

To enable this selective mode of operation in a present embodiment of the invention, the VPN unit is configured to exchange VPN traffic with the public network in tunnel format. VPN data packets adhering to tunnel format comprise a header and a body. The header includes source and destination addresses corresponding to the VPN units serving the origination and destination VPN members, respectively. The body comprises the original data packet generated by the originating VPN member, including the addresses of the origination and destination endstations. The source VPN unit receives the original packet from the originating VPN member, appends the header, and encrypts the body before transmitting the VPN packet toward its destination. The destination VPN unit receives the VPN packet from the public network, removes the header, decrypts the body, and forwards the original packet toward the destination endstation.

A VPN unit operating in this selective mode of operation will not be a single point of failure for all data traffic passing between the organization's private network and the public network, and can be replaced without disrupting non-VPN traffic. Advantageously, non-VPN traffic bypasses the VPN unit, thereby avoiding any delay that may be imparted by the VPN unit. In an alternative embodiment of the invention, multiple private networks are connected to a single VPN unit.

DEFINITIONS

Figure 1:
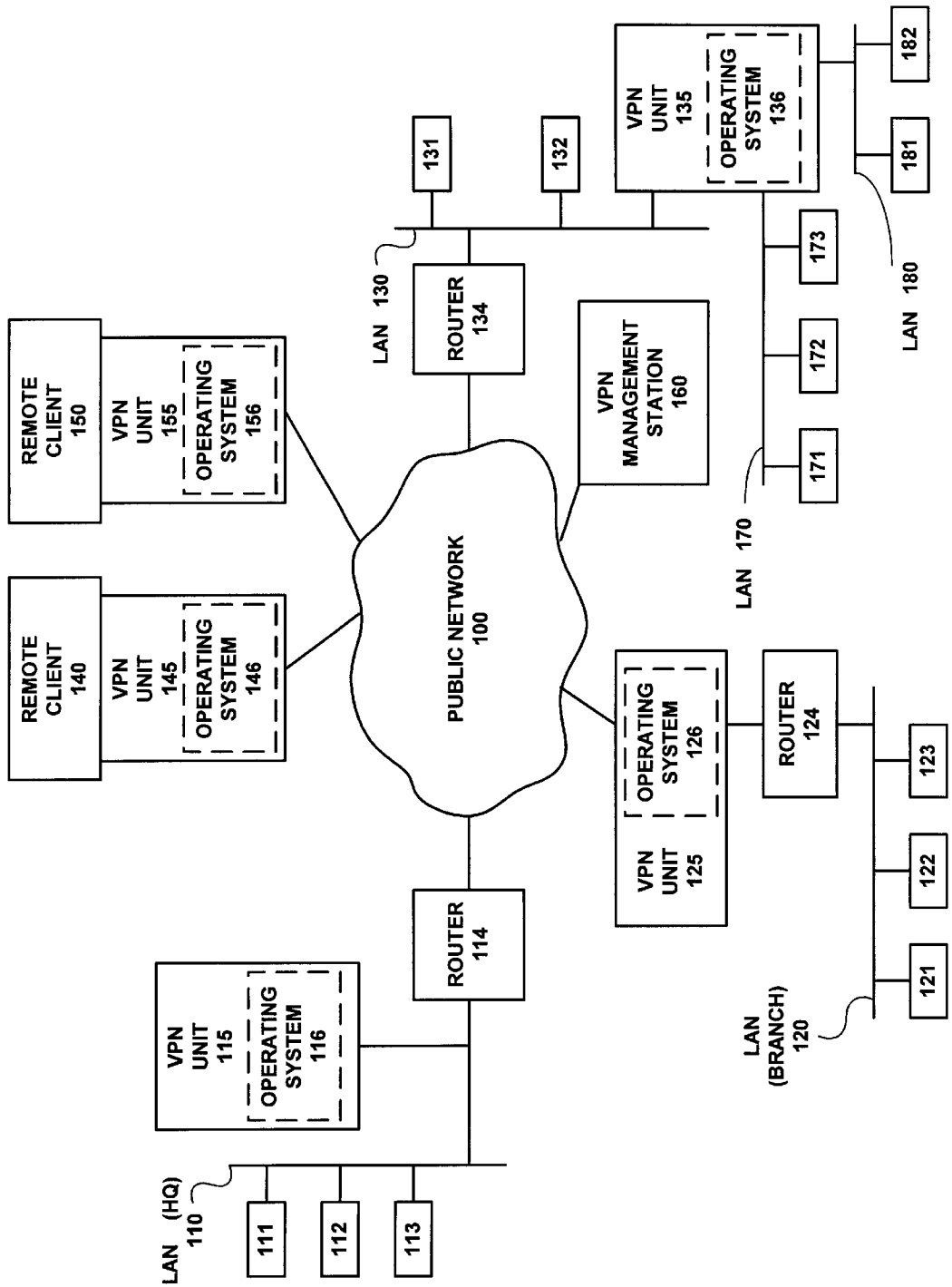
FIG. 1 illustrates a public network 100 including VPN units 115, 125, 135, 145, and 155 operating under control of VPN management station 160 in accordance with an aspect of the present invention.

Configuration Parameters—parameters sent to a VPN unit to configure the VPN unit to appropriately handle communications between members of VPNs.

Group of Nodes—a group of nodes on a public network. In one variation, these nodes belong to the same local network. In another variation, these nodes are specified by at least one net/mask pair.

Local Address—an address on the same private network (or local network), wherein the private network is separated logically or physically from a public data network.

Local Network—a private network (or a local network) separated logically or physically from a public data network.

Net/Mask Pair—a specification for a group of network addresses including a network ID and a network address mask.

Network Group—same as group of nodes.

Non-local Address—an address on a different private network (or local network), wherein private networks are separated logically or physically from a public data network.

VPN traffic—communications intended to be transmitted within a virtual private network.

DETAILED DESCRIPTION OF THE INVENTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein. For example, the present invention is described predominantly in terms of utilizing the Internet as a communications medium. However, the concepts discussed herein are broad enough to accomplish the implementation of secure virtual private networks over other public or relatively unsecure communications media. In addition, although the invention is implemented in the form of a virtual private network unit, the concepts and methods of the invention are readily adaptable to communication devices performing other functions.

Throughout this detailed description, numerous specific details are set forth, such as particular encryption or key management protocols, in order to provide a thorough understanding of the present invention. To one skilled in the art, however, it will be understood that the present invention may be practiced without such specific details. In other instances, well-known control structures and system components have not been shown in detail in order not to obscure the present invention.

The present invention is not limited to any one particular implementation technique. Those of ordinary skill in the art will be able to implement the invention with various technologies without undue experimentation once the functionality to be carried out by such components is described. In many instances, components implemented by the present invention are described at an architectural, functional level. Many of the elements may be configured using well-known structures, particularly those designated as relating to various compression or encryption techniques. Additionally, for logic to be included within the system of the present invention, functionality and flow diagrams are described in such a manner that those of ordinary skill in the art will be able to implement the particular methods without undue experimentation. It should also be understood that the techniques of the present invention may be implemented using a variety of technologies. For example, the VPN unit to be described further herein may be implemented in software running on a computer system, or implemented in hardware utilizing either a combination of microprocessors or other specially designed application specific integrated circuits, programmable logic devices, or various combinations thereof.

Description of a Virtual Private Network (VPN)

FIG. 1 illustrates a public network 100, such as the Internet, including VPN units 115, 125, 135, 145 and 155 operating under the control of VPN management station 160 in accordance with an embodiment of the present invention. Public network 100 may be any type of communication channel, including, but not limited to, data networks such as the Internet.

Headquarters local area network (LAN) 110, including three endstations 111, 112 and 113, is coupled to public network 100 through router 114. In FIG. 1, VPN unit 115 is coupled to the connection between router 114 and LAN 110. In an alternative embodiment of the invention, however, VPN unit 115 is coupled to the connection between router 114 and public network 100.

Branch LAN 120, which includes endstations 121, 122 and 123, is connected to public network 100 through VPN unit 125 and router 124. LAN 130 is coupled to public network 100 through router 134. LAN 130 comprises VPN unit 135 and a plurality of computers, illustratively 131 and 132. In addition, LANs (which may, alternatively, comprise segments of LAN 130) 170, 180 connect to public network 100 through VPN unit 135 and LAN 130.

FIG. 1 thus illustrates great flexibility in the placement and configuration of VPN units. They may be located within a private LAN or LAN segment or between a private LAN and a public LAN. They may, in addition, serve multiple LANs or LAN segments.

Data communications within headquarters LAN 110, branch LAN 120, LAN 130 and other LANs or LAN segments participating in a virtual private network may adhere to any of a wide variety of network protocols, the most common of which are Ethernet and Token Ring. In one embodiment of the invention, however, a VPN unit may be configured to require a particular protocol (e.g., Ethernet).

VPN units 145 and 155 couple remote clients 140 and 150, respectively, to public network 100. Remote clients are systems coupled to public network 100 from remote locations. It is frequently desirable for members of an enterprise who are travelling or working from home or other remote locations to exchange data with members of the enterprise situated at other locations. For example, remote clients 140 and 150 may communicate with headquarters LAN 110 over long distance telephone lines or other point-to-point links. As another example, client 140 may, from one remote location, communicate through VPN units 145 and 155 with client 150, at another remote location, without the participation of other VPN units or members of LANs 110, 120 or 130.

Advantageously, remote clients 140 and 150 have access to public network 100 through local Internet service providers (ISPs). In one embodiment, VPN units 145 and 155 are implemented as hardware modules. In another embodiment, VPN units 145 and 155 are implemented as software modules within remote clients 140 and 150, respectively.

For purposes of the present invention, each of VPN units 115, 125, 135, 145 and 155 serves its remote client or local area network to enable the exchange of secure communications among the remote clients and stations within the local area networks via the Internet (or other public network). VPN units 115, 125, 135, 145 and 155 include operating systems 116, 126, 136, 146 and 156, respectively, which control the operation of the respective VPN units. An illustrative internal structure of VPN unit 115 is described in more detail below with reference to FIG. 5.

Note that while VPN unit 115 is simply coupled to an interconnection between headquarters LAN 110 and public network 100, VPN unit 125 comprises an integral part of the communication path between branch LAN 120 and public network 100. Therefore, in the embodiment of the invention depicted in FIG. 1, only selected data communications passing between public network 100 and LAN 110 are handled by VPN unit 115. All communications passing between public network 100 and LAN 120, however, must be processed by VPN 125. To ensure the necessary security for communications between VPN members, in the illustrated embodiment VPN traffic involving endstations within LAN 110 conform to a "tunnel" format while VPN traffic involving endstations in LAN 120 may conform to either the "tunnel" or "transport" format, both of which are described below.

VPN management station 160 illustratively has control over all VPN units participating in the management station's virtual private network. In a present embodiment of the invention, VPN management station 160 issues commands and configuration information to VPN units 115, 125, 135, 145 and 155 through public network 100. Although FIG. 1 depicts only one VPN management station, in an alternative embodiment of the invention multiple management stations serve a virtual private network.

VPN management station 160 may be implemented in software running on a computer system, or alternatively may be implemented in hardware utilizing a combination of microprocessors or other specially designed application specific integrated circuits, programmable logic devices, or various combinations thereof. VPN management station 160 illustratively maintains a database concerning the VPN units it manages, to include various information such as configuration data, VPN unit identities, etc. The database may be located on the management station or another computer system coupled to the management station.

According to an embodiment of the invention, VPN unit 115 is configured to send and receive data communications between members of a virtual private network that includes one or more endstations attached to headquarters LAN 110. However, VPN unit 115 only receives and processes data directed to or from a VPN member located within LAN 110 when the data are to be secured while in transit (e.g., the data constitutes VPN traffic). Because not all communications passing between headquarters LAN 110 and public network 100 constitute VPN traffic, only a portion of the data packets passed between the interconnected networks are received by VPN unit 115. VPN communications directed from LANs 110, 120 and 130 to VPN members external to the originating LAN are encrypted before being passed to the public network, while those passed in the other direction are decrypted before being passed to the destination LAN. In a present embodiment of the invention, however, a VPN unit operating in selective mode, such as VPN unit 115, does not receive or process communications that are not VPN traffic.

To enable this selective mode of operation, VPN traffic sent or received by endstations within headquarters LAN 110 conform to a "tunnel" format. In this tunnel format, data packets generated by an endstation in LAN 110 are received by VPN unit 115 where they are encrypted and encapsulated within VPN packets addressed to the VPN unit serving the destination endstation. Conversely, when VPN unit 115 receives a VPN packet from public network 100, it strips off the destination address (which corresponds to VPN unit 115), decrypts the remainder, and forwards the packet to LAN 110 for delivery to the appropriate station.

In this embodiment of the invention, a VPN unit operating in selective mode is linked to a LAN/public network interconnection through a network communication port. The VPN unit may have multiple network communication ports. In one alternative embodiment of the invention in which a selective mode VPN unit has two or more network communication ports, the VPN unit connects to multiple private or public networks and/or interconnections between a private and a public network. Illustratively, each connection is through a different network communication port, although in other alternative embodiments, multiple network connections are made through a single port. The VPN unit in an alternative embodiment, therefore, services endstations within two distinct LANs, allowing them all to participate in virtual private networks.

LANs for the different sites (e.g., headquarters LAN 110, branch LAN 120, LAN 130) illustrated in FIG. 1 access public network 100 through associated routing or gateway devices. In the illustrated embodiment of the invention, these devices are routers 114, 124 and 134. In alternative embodiments of the invention, routers 114, 124 and 134 are situated in locations other than as depicted in FIG. 1. In one alternative embodiment, router 114 is situated between LAN 110 and the point at which VPN unit 115 links to the connection between LAN 110 and public network 100. In another alternative embodiment, router 124 is situated between VPN unit 125 and public network 100.

Data packets conveyed between the various endstations and remote clients illustrated in FIG. 1 generally traverse a plurality of additional routing devices on their journey. Various mechanisms for transferring data packets over a public network 100, such as the Internet, are well known and are not described in detail herein. In one embodiment, packets are assembled in accordance with the Internet Protocol (IP) and are referred to herein as IP packets regardless of the protocol in effect at the time of assembly.

The placement of the various VPN units in the overall system architecture illustrated in FIG. 1 represents only one placement scheme. Other configurations are possible. The only requirement is that VPN traffic (e.g., data to be securely transmitted via a VPN) is routed through VPN units. In another embodiment, multiple VPN units are located on an individual LAN. In yet another embodiment, a single VPN unit serves multiple LANs or multiple segments of a single LAN.

VPN units maintain lookup tables for identifying members of specific virtual private networks and groups within a particular virtual private network. When VPN traffic is sent between source and destination endstations that are both members of the same VPN, the VPN unit serving the source endstation processes the data packet, encrypts it, compresses it (if necessary), and adds authentication information as needed. Likewise, the receiving VPN unit that serves the destination endstation will determine that a received data packet is VPN traffic being propagated between members of a particular VPN. The receiving VPN unit authenticates, decrypts and decompresses the packet (as necessary) before forwarding it toward the destination endstation. Secure data communications are thus enabled in a manner that is transparent to end users.

When a VPN unit receives a packet from a remote client that is unknown to it (e.g., not currently authenticated), the system attempts to authenticate the remote client before forwarding traffic from that client. Illustratively, the VPN unit issues a challenge to the remote client, requiring the remote client to authenticate itself. If authentication is successful, the system dynamically retrieves configuration information for the remote client from a database and further traffic from that client will be processed according to the retrieved configuration information. As described above in the case of remote clients 140 and 150, VPN units 145 and 155 may be implemented in software that operates in conjunction with the communication software used to connect the remote client to an Internet Service Provider (ISP).

Additional disclosure concerning virtual private networks and VPN units, including their operation and configuration, is provided in a related application having U.S. Ser. No. 09/065,899, which was filed on Apr. 23, 1998 and is hereby incorporated by reference.

VPN Traffic

As mentioned above, VPN units may transmit VPN traffic in either tunnel or transport format. When configured according to the transport format, a data packet is routed according to the addresses of the originating and destination endstations (or remote clients). In tunnel mode, by contrast, a data packet is routed to/from the VPN units serving the communicating endstations or remote clients. In other words, the header information (which is used to route a packet through public network 100) differs according to the selected mode of transmission. Advantageously, VPN units operating in selective mode, as described above, process VPN traffic in tunnel format.

Figure 2:
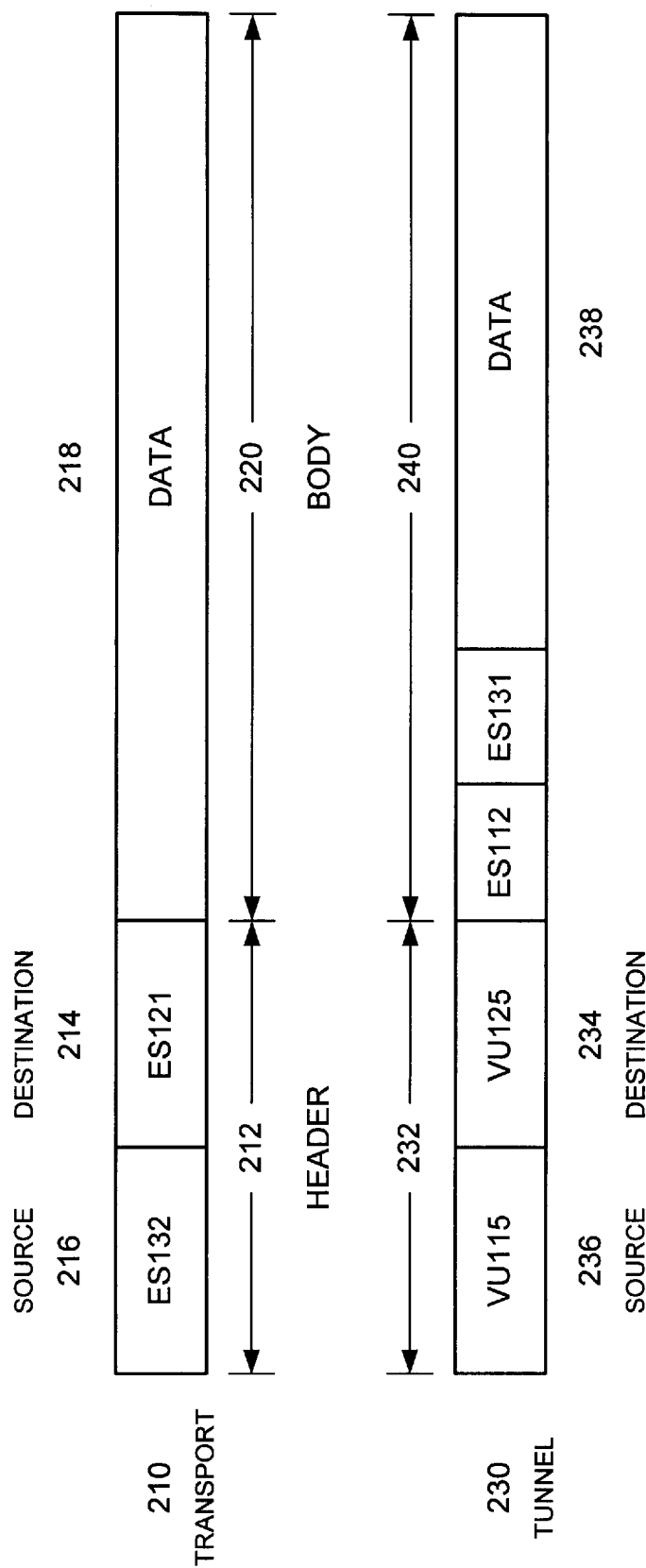
FIG. 2 is a block diagram illustrating the configuration of VPN data packets constructed according to the transport and tunnel formats.

In FIG. 2, data packets 210, 230 are depicted. Transport packet 210 and tunnel packet 230 are illustratively passed across a VPN from endstations 112, 132 (in headquarters LAN 110 and LAN 130, respectively) for delivery to endstation 121 in LAN 120. Headers 212, 232 of packets 210, 230 demonstrate the difference between the two formats. Destination address 214 of transport data packet 210 refers to the specific destination endstation, endstation 121, while destination address 234 of data packet 230 instead refers to VPN unit 125, which handles VPN traffic for destination endstation 121. Source address 216 of data packet 210 indicates originating endstation 132, while source address 236 corresponds to VPN unit 115, which handles VPN traffic on behalf of originating endstation 112. Both data packets will be received and processed by VPN unit 125 before being delivered to endstation 121.

Data sections 218, 238 contain data being delivered to the destination endstation. Illustratively, data section 218 of transport data packet 210 contains the data that endstation 132 wishes to communicate to endstation 121 (e.g., text of an e-mail message). Data section 238 of tunnel data packet 230 illustratively includes the entire packet as originated by endstation 112, including IP addresses corresponding to the origination and destination endstations. As described below, in a present embodiment of the invention the bodies of VPN data packets (e.g., bodies 220, 240) are encrypted prior to transmission by the sending VPN unit, in both the transport and tunnel mode of operation.

Advantageously, an entity that intercepts data packet 230 can only learn the identity of the VPN units that are handling the packet on behalf of the communicating endstations. An entity that intercepts data packet 210, however, may be able to ascertain the true identity of the communicants.

It can be seen in FIG. 2 that, in an illustrative embodiment of the invention, in order to secure the contents of a packet received from an originating endstation for transmission in transport format, a VPN unit may simply encrypt the body of the packet. In FIG. 2, VPN unit 125, which serves destination LAN 120, receives and processes all traffic addressed to the network. Therefore, even though a transport data packet is addressed to a specific endstation, VPN unit 125 still processes the packet (to decrypt its body, for example) before the packet is delivered.

A VPN unit sending tunnel format packets, such as VPN unit 115 operating in selective mode, secures a packet received from an originating endstation by encrypting the entire original packet and appending a header consisting of addresses corresponding to itself and the VPN unit serving the destination endstation. In selective mode, instead of receiving and processing all traffic passed between interconnected public and private networks, a VPN unit illustratively only receives communications that constitute VPN traffic; "normal" traffic bypasses the VPN unit.

Parameters and configuration data such as the form of packets (e.g., transport or tunnel) to be used within a particular VPN are stored in lookup tables maintained in each VPN unit. In a present embodiment of the invention, the lookup table associated with the VPN to which a data packet's origination and destination endstations belong also identifies the algorithms to be applied to encrypt or compress the packet. For example, the lookup table associated with a particular VPN will indicate whether or not data packets transferred between members of the VPN are to be compressed and, if so, the specific compression algorithm to be used. Many compression algorithms are known, but in one embodiment of the invention LZW compression is used. The lookup table additionally identifies the authentication and any key management protocol information that is used.

The particular packet processing algorithms to be used for communications within a VPN may vary, so long as the lookup tables in both the sending and receiving VPN units identify equivalent algorithms. It is assumed that the lookup tables maintained by all of the VPN units within a VPN are consistent, i.e., that the tables within each VPN unit report the same membership for each VPN. However, as an alternative to lookup tables, VPN units may be programmed to use the same algorithms for all VPNs.

Figure 3:
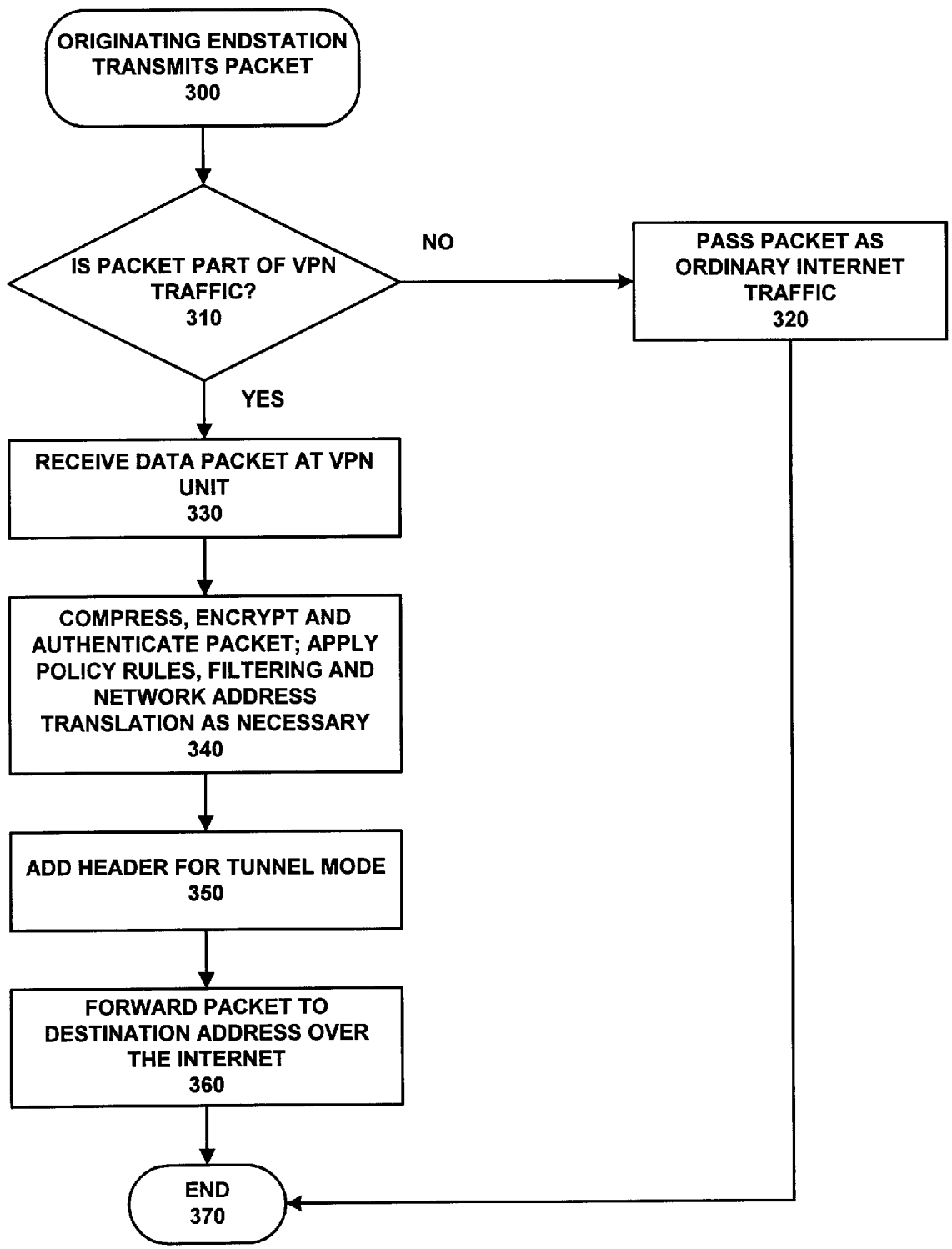
FIG. 3 is a flow chart illustrating the process by which a VPN data packet is transmitted from one member of a VPN to another member of the VPN, in tunnel mode format, over a public data network in accordance with an aspect of the present invention.

FIG. 3 is a flow chart depicting an illustrative method of processing a VPN data packet originated by an endstation in LAN 110 and destined for another endstation outside of LAN 110. The packet proceeds from endstation 111, for example, over LAN 110 toward public network 100. Because the packet is to be secured for transmission via a VPN, VPN unit 115, operating in selective mode, receives and encapsulates the packet as described above. VPN unit 115 then forwards the packet to router 114. Router 114 receives and formats the data packet in accordance with the active Internet Protocol, thereby forming an outbound IP packet. Advantageously, data packets that do not constitute VPN traffic are transmitted directly to router 114 from LAN 110, thus bypassing VPN unit 115.

In FIG. 3, the transmit procedure begins in state 300 when the originating endstation issues a data packet addressed to an endstation external to LAN 110. At decision box 310 the routing architecture in place for LAN 110 (illustratively, a router such as router 114) determines whether the packet constitutes VPN traffic. In one embodiment of the invention, the packet is considered to constitute VPN traffic when the origination and destination endstations are both members of the same VPN. This determination may be aided by reference to a lookup table in VPN unit 115, a different VPN unit, a routing table, etc. In another embodiment of the invention, packets are dropped if they do not constitute VPN traffic. This is appropriate where, for example, a particular endstation is only permitted to communicate via a VPN (e.g., the endstation is only allowed to send and/or received secure communications).

If the packet does not constitute VPN traffic, it is forwarded in state 320 as ordinary Internet traffic, through router 114 to Internet 100. In one embodiment of the invention, network address translation (NAT) is performed on the packet before it is forwarded to Internet 100. In yet another embodiment of the invention, the packet is filtered for access control purposes to ensure that the originating endstation is authorized to communicate with the intended destination endstation. One skilled in the art of networking will understand that by bypassing VPN unit 115, ordinary traffic does not suffer any delay that may be imposed upon packets processed by the VPN unit. From state 320, the system proceeds to end state 370.

If, however, the packet constitutes VPN traffic, it is directed or routed to VPN unit 115 in state 330, possibly by a router such as router 114. Router 114 may, for such purposes, maintain its own lookup table in order to determine when packets are to be routed to VPN unit 115 and when they are to be forwarded directly to public network 100. VPN unit 115 then processes the data packet in state 340 to apply the specified combination of compression, encryption and authentication algorithms. VPN unit 115 may also, in state 340, apply VPN policy rules, perform network address translation and/or filter the packet to enforce access control. Note that VPN unit 115 may serve multiple VPNs, and that a particular network address may be a member of multiple VPNs.

In state 350, VPN unit 115 adds the header that characterizes data packets constructed according to the tunnel format. Specifically, and as shown in tunnel mode data packet 230 (in FIG. 2), VPN unit 115 inserts its address as the source of the tunnel mode packet and the address of the VPN unit serving the destination endstation as the destination of the packet. The identity and address of the appropriate destination VPN unit are illustratively retrieved from a lookup table in VPN unit 115. Finally, in state 360 the tunnel mode packet is forwarded toward the destination VPN unit over the public data network (e.g., through router 114). The sending procedure then ends at state 370.

Figure 4:
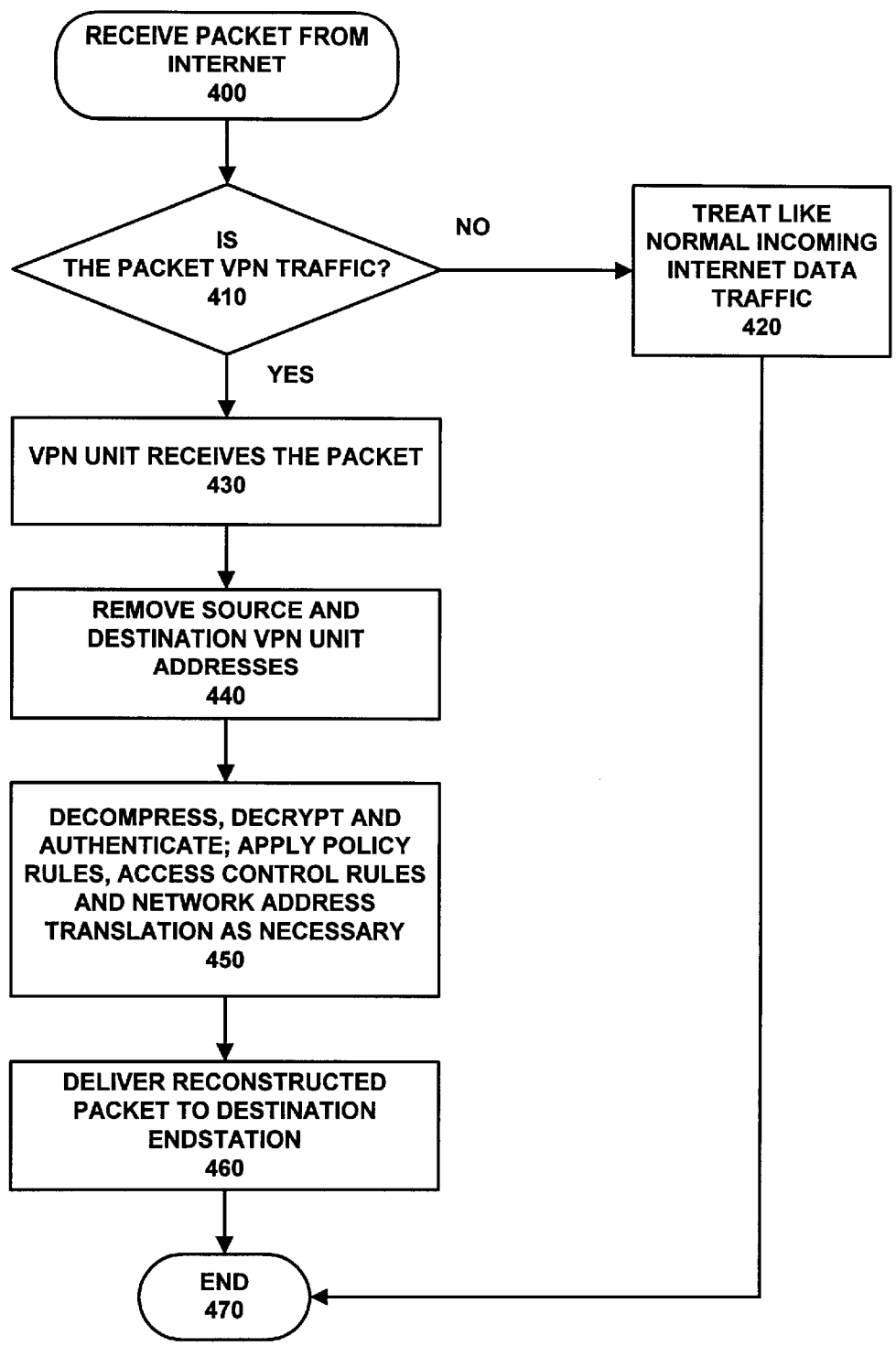
FIG. 4 is a flow chart illustrating the process by which a tunnel mode VPN data packet is received over a public data network by one member of a VPN, from another member of the VPN, in accordance with an aspect of the present invention.

FIG. 4 is a flow chart depicting an illustrative method of processing a packet received over public data network 100 by VPN unit 115 in accordance with an embodiment of the present invention. The reception procedure 400 begins when an inbound data packet destined for an endstation in LAN 110 is received from the Internet. At decision box 410 the inbound data packet is examined to determine if it constitutes VPN traffic. Illustratively, this examination is performed by router 114. In one embodiment of the invention, the packet is dropped if it is not VPN traffic. This is appropriate where, for example, endstations within the destination LAN are only permitted to receive secure (e.g., VPN) communications.

Because VPN unit 115 is operating in a selective mode of operation, in the illustrated embodiment, VPN traffic to and from the endstations it serves adheres to the tunnel format, which is described above. Therefore, as demonstrated in packet 230 (in FIG. 2), a packet received from Internet 100 in the illustrated method cannot be VPN traffic if the destination address in its header is that of an endstation in LAN 110. It will be recalled that, in tunnel mode, not only is all outgoing VPN traffic from LAN 110 delivered to VPN unit 115 for encapsulation and delivery to Internet 100, but all VPN traffic destined for stations within LAN 110 is first received by VPN unit 115.

If the destination address of the packet received from Internet 100 is an endstation in LAN 110, then in state 420 the packet is forwarded to LAN 110 for delivery to the endstation as normal Internet traffic. NAT and/or filtering, as described above in conjunction with FIG. 3, may be applied to the non-VPN packet before the packet is forwarded. After state 420, the system proceeds to end state 470.

If, however, the packet constitutes VPN traffic, in which case the destination address in its header corresponds to VPN unit 115, the packet is delivered to VPN unit 115 in state 430. Any suitable routing device situated between Internet 100 and LAN 110 (or even within LAN 110), including router 114, may make the determination in box 410 as to whether a data packet received from Internet 110 constitutes VPN traffic or not, and thereby route the packet accordingly.

In state 430, VPN unit 115 receives a packet determined to be VPN traffic. In state 440 VPN unit 115 strips the header from the VPN packet in preparation for recovering the original data packet. Then, in state 450, VPN unit 115 recovers the original data by applying the decompression and decryption algorithms in effect for the VPN to which the originating and destination endstations belong. VPN unit 115 may also apply access control rules (e.g., filtering), network address translation and/or any VPN policy rules. The reconstructed packet is then forwarded to the destination endstation in state 460. The system then proceeds to state 470, which is an end state.

CLIENT IP ADDRESS POOLS

When a VPN unit operates in selective mode, as does VPN unit 115 in an embodiment of the invention illustrated in FIG. 1, the VPN unit must receive all VPN traffic exchanged between the public network and the private network(s) served by VPN unit. VPN traffic cannot be properly handled (e.g., encrypted, compressed) in the illustrated embodiment unless it is processed by a VPN unit. In one embodiment of the invention, in order to ensure that all VPN traffic passed between public network 100 and LAN 110 is processed by VPN unit 115, VPN unit 115 maintains a client IP address pool.

A client IP address pool is a pool of IP addresses (in the illustrated embodiment, they are local IP addresses) that are dynamically assigned by a VPN unit to remote clients and/or endstations external to the private network(s) served by the VPN unit. Illustratively, pool addresses are assigned only after traffic has been received (and authenticated) from a remote client or external endstation. In addition, in a present embodiment of the invention address assignments expire after a period of time and may then be re-assigned to another entity.

With a client IP address pool, communications directed to addresses in the pool are delivered to the VPN unit. Thus, by assigning an address from the pool to a remote station, the VPN unit receives communications sent to the remote station from endstations served by the VPN unit. When the VPN unit receives a communication from a local endstation directed to a pool address assigned to a remote station, the VPN unit processes the communication in accordance with the appropriate VPN protocol(s) and then forwards the communication to the remote station. VPN traffic sent from the remote station for endstations served by the VPN unit are addressed and delivered to the VPN unit, illustratively in accordance with the tunnel packet format described above.

In an alternative embodiment of the invention, a VPN unit employs a pool of remote addresses rather than local addresses. In such a case, however, the routing architecture serving the remote network having the remote addresses must be configured to route communications addressed to the remote addresses to the VPN unit.

Figure 5:
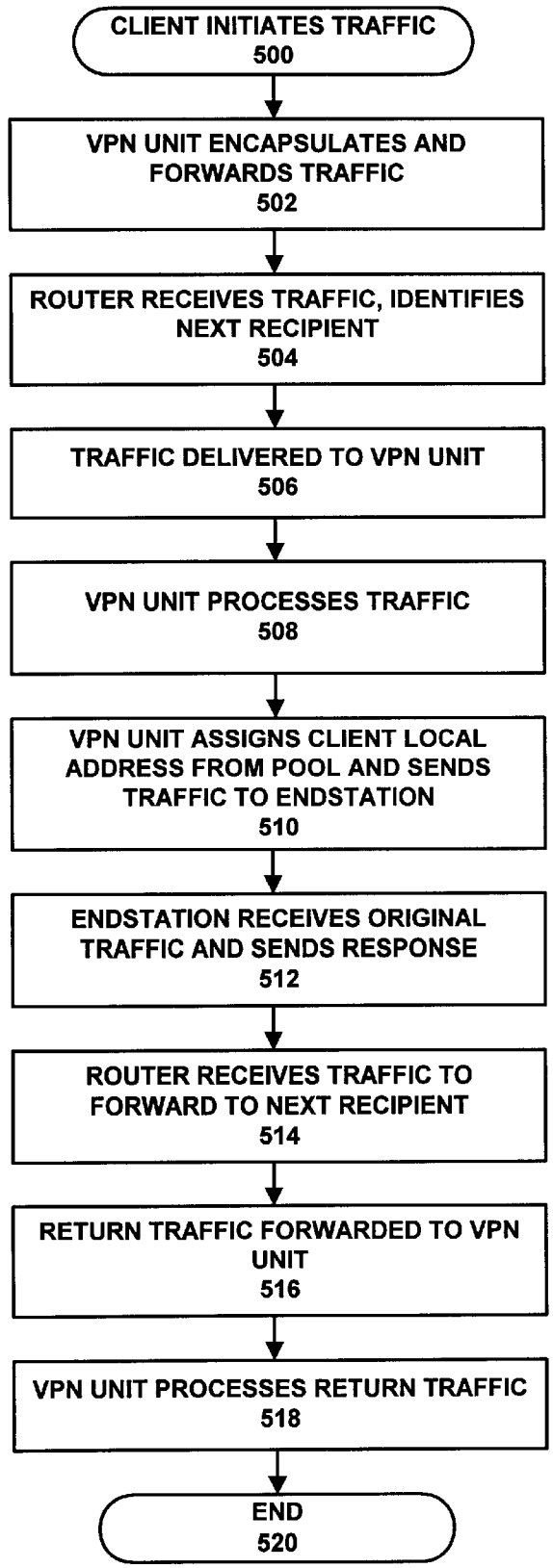
FIG. 5 is a flow chart illustrating a process for exchanging VPN traffic between a remote client and VPN members served by a VPN unit operating in selective mode.

FIG. 5 depicts an illustrative procedure in which remote client 150 in a VPN depicted in FIG. 1 is assigned a local IP address by VPN unit 115 (illustratively operating in selective mode). Prior to the procedure of FIG. 5, VPN unit 155 is configured appropriately (an exemplary process for which is described below). VPN unit 155 is configured, for example, to exchange VPN traffic with VPN member endstations of LAN 110 in tunnel format. For purposes of illustration, VPN unit 115 has an IP address of 10.1.0.10 and maintains a client IP address pool of local addresses in the range 10.1.0.50 to 10.1.0.255, corresponding to LAN 110.

In start state 500 remote client 150 initiates VPN traffic destined for endstation 113. As described above, VPN unit 155 processes and encapsulates the traffic in tunnel format in state 502 and forwards it to VPN unit 115. In state 504, the traffic is conveyed across Internet 100 and is received by router 114, which broadcasts an Address Resolution Protocol (ARP) message to determine where the traffic (addressed to 10.1.0.10) should be delivered. As stated above, router 114 as pictured in FIG. 1 is merely one possible means for routing communications within headquarters LAN 110 and/or between LAN 110 and Internet 100.

One skilled in the art will recognize that ARP requests are merely one method by which router 114 may identify the proper recipient of communications having local destination addresses. Alternative methods may be employed without exceeding the scope of the invention.

In state 506, VPN unit 115 responds to the ARP request and router 114 forwards the traffic to VPN unit 115. VPN unit 115 de-encapsulates and processes (e.g., authenticates, decrypts and decompresses) the traffic in state 508 to recover the original communication. In state 508, the VPN unit may apply filtering rules (e.g., to enforce an access control policy). VPN unit 115 then, in state 510, changes the source address of the original traffic from the actual IP address of remote client 150 to the next available address in its client IP address pool (e.g., 10.1.0.99) and forwards the traffic to endstation 113. By changing the remote client's source address, return traffic from endstation 113 will be addressed to 10.1.0.99, which ensures that the traffic will be delivered to VPN unit 115.

In state 512, endstation 113 receives the communication from client 150 and generates return traffic to destination address 10.1.0.99. Router 114 receives the return traffic in state 514 and broadcasts an ARP message for address 10.1.0.99. In state 516, VPN unit 115, standing in for remote client 150, responds to the ARP message and router 114 forwards the return traffic to VPN unit 115.

VPN unit 115 then processes the return traffic in state 518 to encapsulate it and apply any necessary encryption, compression and authentication algorithms. VPN unit 115 also replaces the local IP address of the return traffic with the origination address of the original traffic. In end state 520, the return traffic is forwarded to Internet 100 for routing and delivery to VPN unit 155 and client 150.

Description of a VPN Unit

Figure 6:
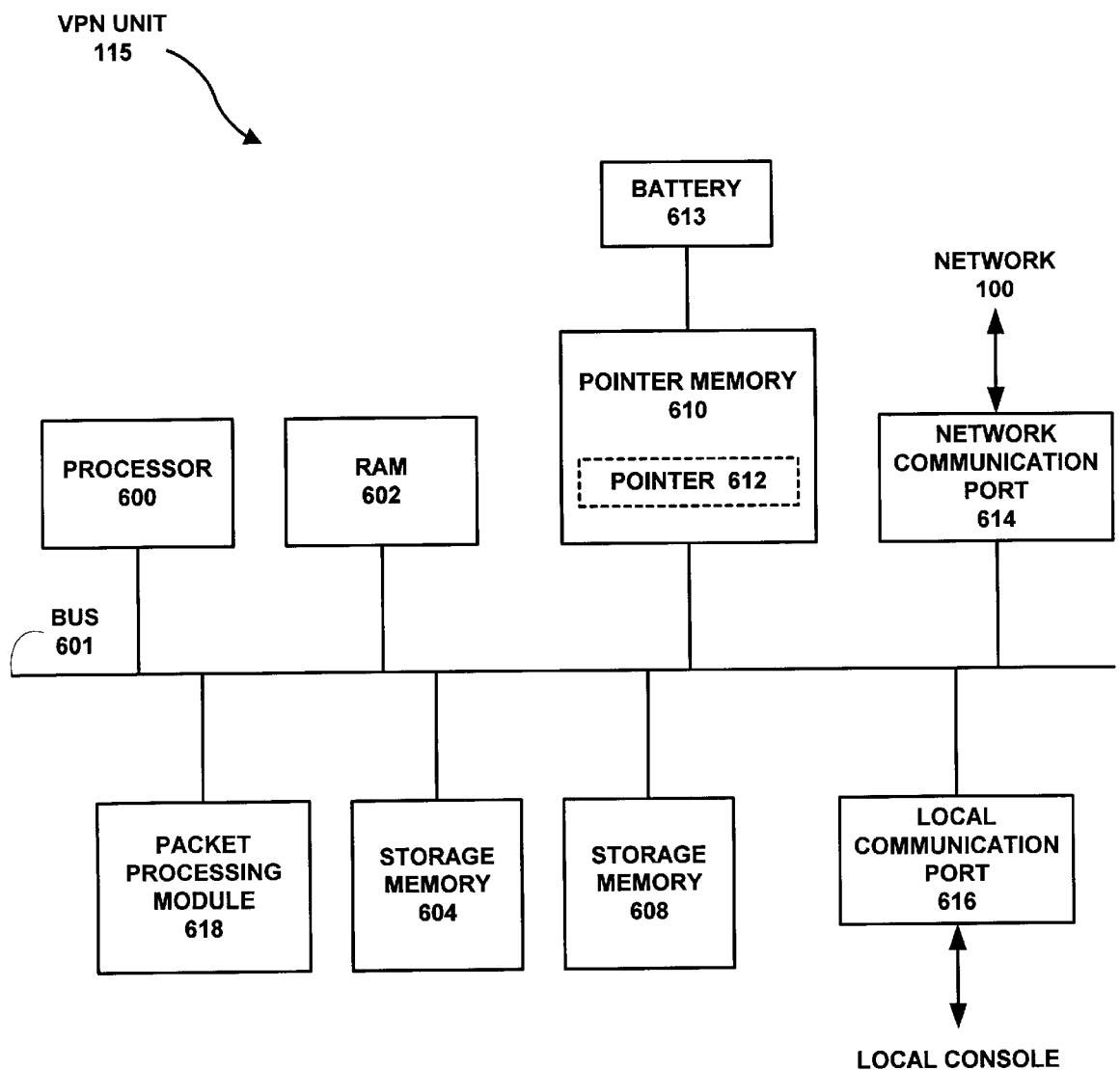
FIG. 6 is a block diagram illustrating a portion of the internal structure of VPN unit 115 from FIG. 1 in accordance with an aspect of the present invention.

FIG. 6 is a block diagram illustrating a portion of the internal structure of VPN unit 115 according to an embodiment of the present invention. It is understood that the layout depicted in FIG. 6 is illustrative and does not limit the scope of the invention.

VPN unit 115 includes processor 600, which is coupled to RAM 602, for executing instructions stored in RAM 602. VPN unit 115 also includes storage memories 604, 608, which take the form of non-volatile flash PROMs in one embodiment of the invention. In an alternative embodiment of the invention, VPN unit 115 includes a single storage memory. In FIG. 6, VPN unit 115 further includes pointer memory 610, network communication port 614, local communication port 616, packet processing module 618 and bus 601 for communicating between the various components of VPN unit 115.

Pointer memory 610 includes pointer 612 and other data as described below. In a present embodiment of the invention, pointer memory 610 is coupled to battery 613 in order to preserve the contents of pointer memory 610 in the event of loss of power to VPN unit 115. As described above, VPN units are not limited to a single network communication such as port 614 in FIG. 6. VPN unit 115 may thus include additional network communication ports for communicating with additional networks other than public network 100.

Storage memory 604 illustratively stores boot code, data, and an operating system program. Upon initializing, booting or rebooting VPN unit 115, the boot code is loaded into RAM 602 for execution by processor 600. VPN unit 115 may, for example, be rebooted in response to a command received from a local console through local communication port 616 or a command received from VPN management station 160 (from FIG. 1) through network communication port 614. VPN unit 115 may also be booted when power is restored after a preceding loss of power.

Data stored in storage memory 604 illustratively includes certification data for authenticating VPN unit 115 to VPN management station 160. When VPN unit 115 is to be configured by VPN management station 160, as described below, VPN unit 115 and VPN management station 160 authenticate themselves to each other. This dual authentication process prevents an impostor from masquerading as one or the other and thereby corrupting VPN unit 115 or another element of a virtual private network.

Storage memory 608 illustratively includes configuration data and an alternate operating system program. Configuration data includes information used to operate VPN unit 115, such as: an IP address of the unit, IP addresses of VPN members (e.g., endstations in LAN 110 served by VPN unit 115) that will be exchanging data through the unit, the encryption algorithm to be used for VPN traffic, the authentication algorithm to be used, whether or not to compress data, SNMP (Simple Network Management Protocol) data used to manage the unit (e.g., name and physical description of VPN unit 115), etc. The contents of configuration data are, in one embodiment of the invention, updated when VPN unit 115 is configured or reconfigured by VPN management station 160.

After executing the boot code retrieved from storage memory 604, processor 600 loads (into RAM 602) and executes instructions according to an operating system program from either of storage memories 604, 608. The storage memory from which an operating system program is to be retrieved the next time VPN unit 115 is booted is identified by pointer 612, which is stored in pointer memory 610. Therefore, pointer 612 usually identifies the storage memory from which the currently executing operating system program was retrieved.

In an embodiment of the present invention, pointer memory 610 also stores some of the contents of the configuration data residing in storage memory 608. Illustratively, when VPN unit 115 is configured or reconfigured by VPN management station 160, configuration data essential to the continued operation of VPN unit 115 (e.g., the IP address of VPN unit 115, default route for communicating with the VPN management station) are copied into pointer memory 610. Doing so helps ensure the continued operation of VPN unit 115 during the configuration or reconfiguration process.

Network communication port 614 couples VPN unit 115 to the interconnection of LAN 110 and public network 100.

VPN unit 115 thus receives and transmits VPN traffic through network communication port 614. As mentioned above, network communication port 614 is also the receiving point for configuration information sent from VPN management system 160. Local communication port 616 connects VPN unit 115 to a local console, from which the unit may also be configured.

Packet processing module 618 applies configuration parameters to process packets transiting VPN unit 115. Illustratively, the packet processing module determines whether and/or how a packet is to be encrypted, whether it is to be formatted in tunnel or transport mode, how it is to be addressed, etc.

ILLUSTRATIVE METHODS OF VPN OPERATION

Figure 7:
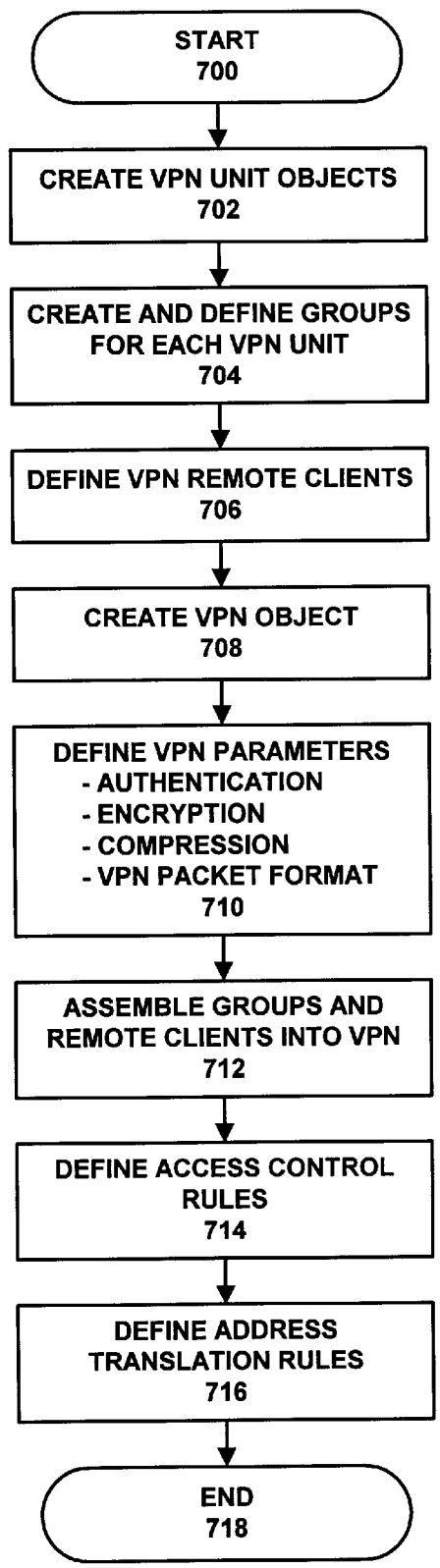
FIG. 7 is a flow chart illustrating some of the operations performed by VPN unit 115 during its configuration and the configuration of a VPN.

FIG. 7 is a flow chart illustrating some of the operations performed by a VPN system manager to create a VPN in accordance with an embodiment of the present invention. The system manager starts at state 700 and proceeds to state 702. In state 702, the system manager issues commands to create VPN unit objects corresponding to physical VPN units on network 100. Illustratively, a VPN unit object is created for each VPN unit in the network. A VPN unit object comprises a number of parameters including, for example, an Internet Protocol (IP) address of the VPN unit. Before VPN unit objects are created and added to the VPN unit database, however, the system manager authenticates each VPN unit and each VPN unit authenticates the system manager. The system manager then proceeds to state 704.

In state 704, the system manager issues commands to create and define group objects for various groups of entities connected to public network 100. In a present embodiment, a group object includes an attribute identifying the VPN unit(s) associated with the group and the net/mask pairs the group defines. The entities within a group may be nodes on a computer network that are addressed by IP address identifiers. The entities may also be system users that are identified by user IDs.

The system manager then proceeds to state 706, in which the system manager identifies remote clients that are to be members of a VPN. Illustratively, a client object is created for each remote client supported by VPN management station 160. A client object comprises a number of attributes, including a listing of the virtual private network(s) the client belongs to and the NSID/MKID identifier for the remote client. In one embodiment, the NSID, or name space ID, is the MD5 hash of a user name, and the MKID is the master key ID of the domain.

The system manager then proceeds to state 708, in which the system manager issues a command to create a VPN object. Illustratively, a VPN object is created for each virtual private network supported by VPN management station 160. A VPN object comprises a number of attributes, including encryption, authentication and compression algorithms, a list of groups, and a list of remote clients included in the corresponding VPN. In state 710, the system manager defines the authentication, encryption and compression algorithms to be associated with each VPN. Next, the system manager proceeds to state 712. In state 712, the system manager assembles groups of entities and remote clients into a VPN. States 710 and 712 are repeated for each VPN that the system manager desires to create.

The system manager then proceeds to state 714. In state 714, the system manager defines access control rules for VPN units. Access control rules specify the types of communications allowed to pass through a VPN unit and, for VPN units operating in selective mode, that VPN traffic is to be passed in tunnel format. Next, the system manager proceeds to state 716.

In state 716, the system manager specifies address translation rules for each VPN unit. These address translation rules support static translation, dynamic translation and port translation. For example, the rules make it possible to use the same address for two different nodes that are located on different local area networks that are coupled to the public network through VPN units. The VPN units use the address translation rules to translate the same local addresses into different public network addresses. Address translation rules also facilitate mapping multiple local addresses to a single public network address. In one embodiment, this is accomplished by using the same public network address with different port identifiers for different local addresses. The system manager then proceeds to state 718, which is an end state.

CONFIGURING A VPN UNIT

As mentioned above, VPN unit 115 periodically receives configuration instructions from VPN management station 160. Illustratively, these commands include requests to: install a new operating system program; configure a VPN (e.g., set up a new VPN, edit an existing VPN, delete a VPN); change an encryption, authentication or compression algorithm; select tunnel or transport format for VPN traffic; store a static route configuration; store or edit a lookup table; reboot the VPN unit; etc.

In an embodiment of the present invention, configuration requests received by a VPN unit are satisfied by a configuration module, which illustratively takes the form of a background operating system process executed by the VPN unit's processor 600. In this embodiment, a configuration module executing on VPN unit 115 monitors network communication port 614 to detect configuration requests sent by VPN management station 160. A configuration module in another embodiment monitors local communication port 616 instead of, or in addition to, network communication port 614, for configuration requests sent from a local console.

The configuration module temporarily stores the contents of configuration requests into RAM 602 as the requests are received. At the end of a pre-specified period of time (e.g., 30 seconds), the new or altered configuration data is stored in long-term storage memory (e.g., a configuration data storage area within storage memory 608, from FIG. 5). As described above, essential configuration data may also be stored in other memory (e.g., pointer memory 610) for redundancy and continuity of operation.

Figure 8:
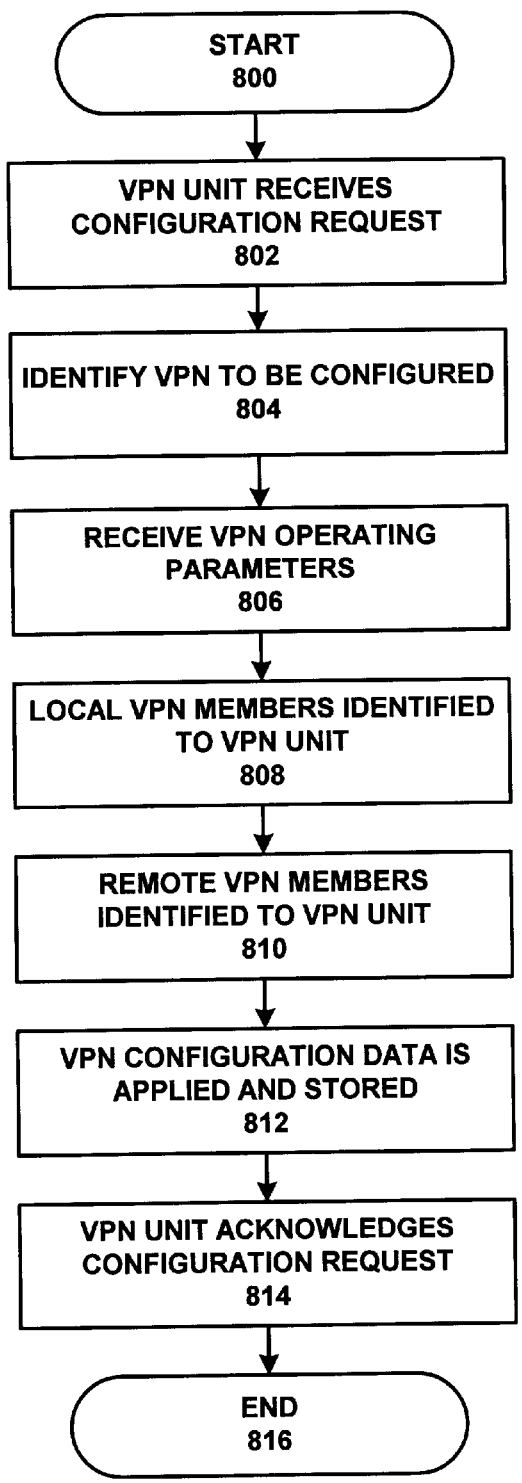
FIG. 8 is a flow chart illustrating some of the operations performed to configure VPN unit 115 to operate in selective mode in accordance with an embodiment of the invention.

FIG. 8 depicts an illustrative procedure in which a configuration module in VPN unit 115 of operating system 116 receives and implements a configuration request. In the illustrated procedure, the configuration request is received from a local console attached to local communication port 616 of VPN unit 115. The configuration request could, alternatively, be received from VPN management station 160 through network communication port 614. The configuration request depicted in FIG. 8 includes various information required by VPN unit 115 in order to exchange VPN traffic across a virtual private network.

The procedure commences with start state 800. In state 802 a configuration request ordering the configuration of a VPN is received from the local console through local communication port 616. In an alternative procedure in which the configuration request is received from VPN management station 160 via network communication port 614, VPN unit 115 and VPN management station 160 authenticate themselves to each other before proceeding.

In state 804, VPN unit 115 receives an identifier corresponding to the VPN being configured. The identifier may correspond to a new VPN or an existing VPN. VPN unit 115 then receives various VPN configuration data for use in the chosen VPN. In state 806, VPN unit 115 receives the configuration data to be applied to the identified VPN. The configuration data illustratively includes the encryption, compression and algorithms for the VPN, and a specification as to whether transport or tunnel formatting is to be applied to VPN data packets.

In state 808, VPN unit 115 is apprised of the local addresses to be included in the VPN. The local addresses correspond to endstations within the private network(s) served by VPN unit 115 that are members of the VPN. VPN unit 115 is also provided with a plurality of IP addresses (preferably local addresses) to be used as a client IP address pool (as described above). In state 810, VPN unit 115 receives the remote addresses corresponding to members of the VPN external to the private network(s) served by VPN unit 115.

The new configuration data is then stored in state 812, illustratively in storage memory 608. Upon successful receipt and storage of the configuration request and the accompanying data, VPN unit 115 acknowledges the request in state 814 and the procedure exits in end state 816.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art.

In particular, a single VPN unit may be configured, as described above, to serve multiple private networks. In such an embodiment, each private network may have its own route to public network 100, but share the one VPN unit. The VPN unit advantageously operates in selective mode, so that only VPN traffic is routed through it. Non-VPN traffic bypasses the VPN unit. Alternatively, each of a plurality of private networks served by a single VPN unit share a single path between the VPN unit and public network 100.

What is claimed is:

1. A method of operating a virtual private network unit to facilitate secure communications between virtual private network members over a public network, comprising:

coupling the virtual private network unit to a first local network via a first data channel;

coupling the virtual private network unit to a first public network via the first data channel;

maintaining a set of addresses in the first local network that are not assigned to members of the virtual private network residing in the first local network;

receiving a first data packet over the first data channel from a first member of the virtual private network in the first local network, wherein the first data packet is addressed to a second member of the virtual private network with a first address from the set of addresses;

replacing the first address with a remote address corresponding to the second member;

transforming the first data packet in accordance with pre-determined rules for transforming data packets sent between members of the virtual private network; and forwarding the transformed first data packet over the first data channel to the public network for delivery to the remote address.

2. The method of claim 1, further comprising:

receiving a secure data packet over the first data channel from the public network;

processing the secure data packet in accordance with pre-determined rules for processing secure data packets sent between members of the virtual private network; and forwarding the processed data packet over the first data channel to the first local network.

3. The method of claim 2, wherein processing the secure data packet comprises:

disassembling the secure data packet; and recovering a second data packet.

4. The method of claim 3, wherein processing the secure data packet further comprises decrypting the second data packet.

5. The method of claim 2, wherein processing the secure data packet comprises translating the secure data packet from a tunnel mode.

6. The method of claim 1, wherein transforming the first data packet comprises encapsulating the first data packet within a secure data packet.

7. The method of claim 6, wherein transforming the first data packet further comprises encrypting the first data packet.

8. The method of claim 6, wherein encapsulating the first data packet comprises:

coupling a source address to the first data packet, the source address corresponding to the virtual private network unit; and coupling a destination address to the first data packet, the destination address corresponding to a second virtual private network unit.

9. The method of claim 1, wherein transforming the first data packet comprises translating the first data packet into a tunnel mode.

10. The method of claim 1, further comprising:

coupling the virtual private network unit to a second local network via a second data channel;

receiving a second data packet from a third member of the virtual private network in the second local network over the second data channel, wherein the second data packet is addressed to a fourth member of the virtual private network;

transforming the second data packet in accordance with said pre-determined rules for transforming data packets sent between members of the virtual private network; and transmitting the transformed second data packet toward the fourth member of the virtual private network;

wherein the first and second data channels comprise separate and distinct signal conductors.

11. The method of claim 10, wherein transmitting the transformed second data packet comprises forwarding the transformed second data packet to the public network over the first data channel.

12. The method of claim 10, further comprising coupling the virtual private network unit to a second public network via the second data channel, wherein transmitting the transformed second data packet comprises forwarding the transformed second data packet to the second public network via the second data channel.

13. The method of claim 12, wherein the first public network comprises the second public network.

14. The method of claim 1, further comprising:
operating the virtual private network unit in a selective mode, in which the virtual private network unit only receives communications from members of the virtual private network.

15. An apparatus for facilitating secure communications between members of a virtual private network, comprising:
a first communication port coupled to a first local network and a public network;
a first storage area containing a first series of instructions for transforming a communication packet received from the public network;
a processor for processing a received communication packet according to said first series of executable instructions; and
a set of local addresses not assigned to virtual private network members coupled to said first local network;
wherein a first communication packet directed from a remote member of the virtual private network to a first member of the virtual private network in said first local network is received at the apparatus with a remote source address corresponding to the remote member; and
wherein the remote source address is replaced with a local address from the set of local addresses before the first communication packet is forwarded to said first local network.

16. The apparatus of claim 15, further comprising:
a second storage area containing a second series of instructions for transforming a communication packet received from said first local network;
wherein a second communication packet received through said first communication port from said first local network is processed in accordance with said second series of instructions and then forwarded through said first communication port toward a member of the virtual private network not in said first local network.

17. The apparatus of claim 16, wherein said processor is configured in accordance with said second series of instructions to modify an address portion of said second communication packet and to encrypt a data portion of said second communication packet.

18. The apparatus of claim 16, wherein said processor is configured in accordance with said second series of instructions to translate said second communication packet into a tunnel mode.

19. The apparatus of claim 15, wherein said processor is configured in accordance with said first series of instructions to modify an address portion of said first communication packet and to decrypt a data portion of said first communication packet.

20. The apparatus of claim 15, wherein said processor is configured in accordance with said first series of instructions to translate said first communication packet from a tunnel mode.

21. The apparatus of claim 15, further comprising:
a second communication port coupled to a second local network;
wherein a second communication packet received through said second communication port from said second local network is processed in accordance with a second series of instructions.

22. The apparatus of claim 21, wherein said second communication port is further coupled to a second public network.

23. The apparatus of claim 22, wherein said second communication packet is forwarded through said second communication port to said second public network.

24. The apparatus of claim 23, wherein said first public network comprises said second public network.

25. The apparatus of claim 15, wherein the apparatus is operable in a selective mode in which the apparatus only receives communications from members of the virtual private network.

26. A method of operating a virtual private network unit in a virtual private network to selectively process communications across a public network between members of the virtual private network, comprising:
operating the virtual private network unit in a selective mode, in which the virtual private network unit only receives communications from members of the virtual private network;
receiving a virtual private network communication at the virtual private network unit, wherein the communication comprises a source address corresponding to a remote client and a destination address corresponding to a member of the virtual private network connected to a local network;
maintaining a set of local addresses not assigned to virtual private network members connected to the local network;
processing the communication to replace the source address with a local address from the set of local addresses; and
forwarding the communication to the local network for delivery to the virtual private network member;
wherein the virtual private network unit is coupled to the public network and the local network through a single communication port.

27. The method of claim 26, further comprising:
receiving a response from the local network sent from the virtual private network member, the response being directed to the local address;
processing the response to replace the local address with the source address; and
forwarding the response to the public network for delivery to the remote client.

28. A method of operating a virtual private network unit within a virtual private network to facilitate the exchange of secure communications across a public network, comprising:
coupling the virtual private network unit to a first local network via a first data channel;
coupling the virtual private network unit to the public network via the first data channel;
maintaining a set of addresses in the first local network that are not assigned to members of the virtual private network residing in the local network;
receiving a first communication over the first data channel, the first communication being directed between a local member of the virtual private network within the first local network and a remote member of the virtual private network;
if the first communication is directed from the remote member to the local member, in the communication, replacing a remote address corresponding to the remote member with a first address from the set of addresses;
if the first communication is directed from the local member to the remote member, in the communication, replacing a first address from the set of addresses with a remote address corresponding to the remote member; and forwarding the communication over the first data channel.

29. The method of claim 28, further comprising:

operating the virtual private network unit in a selective mode, in which the virtual private network unit only receives communications from members of the virtual private network.

30. A communication system for facilitating secure communications over a public network between members of a virtual private network, comprising:

a local network comprising a first member of the virtual private network;

a virtual private network unit operating in a selective mode, in which the virtual private network unit only receives communications from members of the virtual private network;

a pool of addresses in the local network that are not assigned to members of the virtual private network residing in the local network;

a first communication link coupling the local network and the public network; and a second communication link coupling the virtual private network unit to the first communication link;

wherein a communication directed between the first member of the virtual private network and a second member of the virtual private network is received by the virtual private network unit over the second communication link with a first address from the pool of addresses, modified in accordance with a pre-determined series of rules, and forwarded by the virtual private network unit over the second communication link; and wherein the virtual private network unit replaces the first address from the pool of addresses with a remote address corresponding to the second member.

31. A computer readable storage medium storing instructions that, when executed by a computer, cause the computer to perform a method of operating a virtual private network unit in a virtual private network to selectively process communications across a public network between members of the virtual private network, the method comprising:

operating the virtual private network unit in a selective mode, in which the virtual private network unit only receives communications from members of the virtual private network;

receiving a virtual private network communication at the virtual private network unit, wherein the communication comprises a source address corresponding to a remote client and a destination address corresponding to a member of the virtual private network connected to a local network;

maintaining a set of local addresses not assigned to virtual private network members connected to the local network;

processing the communication to replace the source address with a local address from the set of local addresses; and forwarding the communication to the local network for delivery to the virtual private network member;

wherein the virtual private network unit is coupled to the public network and the local network through a single communication port.

32. A computer readable storage medium storing instructions that, when executed by a computer, cause the computer to perform a method of operating a virtual private network unit to facilitate secure communications between virtual private network members over a public network, the method comprising:

coupling the virtual private network unit to a first local network via a first data channel;

coupling the virtual private network unit to a first public network via the first data channel;

maintaining a set of addresses in the first local network that are not assigned to members of the virtual private network residing in the first local network;

receiving a first data packet over the first data channel from a first member of the virtual private network in the first local network, wherein the first data packet is addressed to a second member of the virtual private network with a first address from the set of addresses;

replacing the first address with a remote address corresponding to the second member;

forwarding the first data packet over the first data channel to the public network.

33. A computer readable storage medium storing instructions that, when executed by a computer, cause the computer to perform a method of operating a virtual private network unit within a virtual private network to facilitate the exchange of secure communications across a public network, the method comprising:

coupling the virtual private network unit to a first local network via a first data channel;

coupling the virtual private network unit to the public network via the first data channel;

maintaining a set of addresses in the first local network that are not assigned to members of the virtual private network residing in the local network;

receiving a first communication over the first data channel, the first communication being directed between a local member of the virtual private network within the first local network and a remote member of the virtual private network;

if the first communication is directed from the remote member to the local member, in the communication, replacing a remote address corresponding to the remote member with a first address from the set of addresses;

if the first communication is directed from the local member to the remote member, in the communication, replacing a first address from the set of addresses with a remote address corresponding to the remote member; and forwarding the communication over the first data channel.

* * * * *